US006563726B1

(12) United States Patent
Hirst

(10) Patent No.: US 6,563,726 B1
(45) Date of Patent: May 13, 2003

(54) SYNCHRONOUS BRIDGE RECTIFIER

(75) Inventor: B. Mark Hirst, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/990,447

(22) Filed: Nov. 21, 2001

(51) Int. Cl.$^7$ .................. H02M 7/217; H02M 7/5387
(52) U.S. Cl. ........................ 363/127; 363/132
(58) Field of Search ............................ 363/127, 125, 363/126, 131, 132, 84, 89, 147, 128

(56) References Cited

U.S. PATENT DOCUMENTS

| 3,930,196 | A | 12/1975 | Park et al. |
| 4,535,203 | A | 8/1985 | Jenkins et al. |
| 5,268,833 | A | 12/1993 | Axer |
| 5,510,972 | A | 4/1996 | Wong |
| 6,181,588 | B1 * | 1/2001 | Kates et al. ............ 363/126 |
| 6,201,717 | B1 * | 3/2001 | Grant ...................... 363/60 |

* cited by examiner

Primary Examiner—Rajnikant B. Patel

(57) ABSTRACT

The present invention provides a synchronous full-wave AC rectifier connectable to an AC voltage source. In one embodiment, the synchronous rectifier includes a full-wave diode bridge having four bridge diodes. A power switch is coupled in parallel with each bridge diode, and each power switch has a power switch control gate. A power switch control circuit is coupled in parallel with each bridge diode. Each power switch control circuit provides a first control voltage to its associated power switch control gate to cause the power switch to turn on when the parallel-connected bridge diode is forward biased. Each power switch control circuit provides a second control voltage to its associated power switch control gate to cause the power switch to turn off when the parallel-connect bridge diode is reverse biased. The power switch control circuits turn their associated power switches on and off synchronously with the AC voltage source to provide the full-wave rectified AC output.

27 Claims, 3 Drawing Sheets

SYNCHRONOUS BRIDGE RECTIFIER

CROSS REFERENCE TO RELATED APPLICATION

This patent application is related to the following Non-Provisional U.S. Patent Application: Ser. No. 09/990,145, entitled "Charge-Pumped DC Bias Supply," is assigned to the same assignee as the present application, and is herein incorporated by reference.

THE FIELD OF THE INVENTION

The present invention relates generally to AC rectifiers, and more particularly to a rectifier with a combination diode bridge and synchronous switch bridge to rectify an AC input voltage and provide a DC output voltage.

BACKGROUND OF THE INVENTION

The efficiency of switch mode power converters has increased with improvements in the switches used in the conversion process. However, while synchronous rectification has been utilized on step-down or buck converters in the output stage of DC-DC converters, rectification at the front-end of the converter where the primary AC-to-DC conversion occurs, has been ignored. Although rectifiers of various forms have been developed, power converters continue to utilize the classic four-diode bridge rectifier to perform the AC to DC conversion.

When a four-diode bridge rectifier is in operation, two of the four diodes are conducting at all times, resulting in continuous conduction losses through the bridge diodes that manifests itself in the form of waste heat. The generation of waste heat, in turn, typically necessitates the use of fans and large heat sinks to provide forced convection cooling of the converter. The diode conduction losses and the power to operate the convection fans represents energy that could otherwise be conserved or utilized for other purposes.

Many electronic devices, including laser printers and copy machines, are at or near their maximum design limit for power use allowed by a single power cord and a standard 15 ampere receptacle and will require two power cords if this limit is exceeded. Environmental Protection Agency "low power limit" requirements are also becoming increasingly difficult to satisfy.

Electronic devices, including laser printers and copiers, would benefit from a more efficient primary AC-to-DC conversion process that conserves energy, requires less space, and eliminates the need for heat sinks and forced convection cooling to remove waste heat.

SUMMARY OF THE INVENTION

The present invention provides a synchronous full-wave AC rectifier connectable to an AC voltage source. In one embodiment, the synchronous rectifier includes a full-wave diode bridge having four bridge diodes. A power switch is coupled in parallel with each bridge diode, and each power switch has a power switch control gate. A power switch control circuit is coupled in parallel with each bridge diode. Each power switch control circuit provides a first control voltage to its associated power switch control gate to cause the power switch to turn on when the parallel-connected bridge diode is forward biased. Each power switch control circuit provides a second control voltage to its associated power switch control gate to cause the power switch to turn off when the parallel-connect bridge diode is reverse biased. The power switch control circuits turn their associated power switches on and off synchronously with the AC voltage source to provide the full-wave rectified AC output.

In a second embodiment, the synchronous rectifier includes a full-wave diode bridge having four bridge diodes. A power switch is coupled in parallel with each bridge diode, and each power switch has a power switch control gate. A comparator circuit is coupled in parallel with each bridge diode and is coupled to the power switch control gate of the parallel-connected power switch. Each comparator circuit compares the voltage level across the parallel-connected bridge diode to a reference voltage. Each comparator circuit provides a first control voltage to the power switch control gate when the voltage level across the bridge diode exceeds the reference voltage level to turn on the parallel-connected power switch. Each comparator circuit provides a second control voltage to the power switch control gate when the voltage level across the bridge diode is less than the reference voltage level to turn off the parallel-connected power switch. Three charge pump circuits provide a proper biasing voltage to the comparator circuits so that the comparator circuit can properly bias their associated power switch control gate. The first charge pump circuit is coupled to the first comparator circuit, the second charge pump is coupled to the second comparator circuit, and the third charge is coupled to the third and fourth comparator circuits. The comparator circuits turn their associated power switches on and off synchronously with the AC voltage source to thereby provide a full-wave rectified output.

One aspect of the present invention provides a method for providing a full-wave rectified AC output from an AC voltage source having an AC voltage level. The method includes receiving the AC voltage level for the AC voltage source and applying the AC voltage level to a full-wave diode bridge rectifier having four diodes.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the claims.

Figure 1:
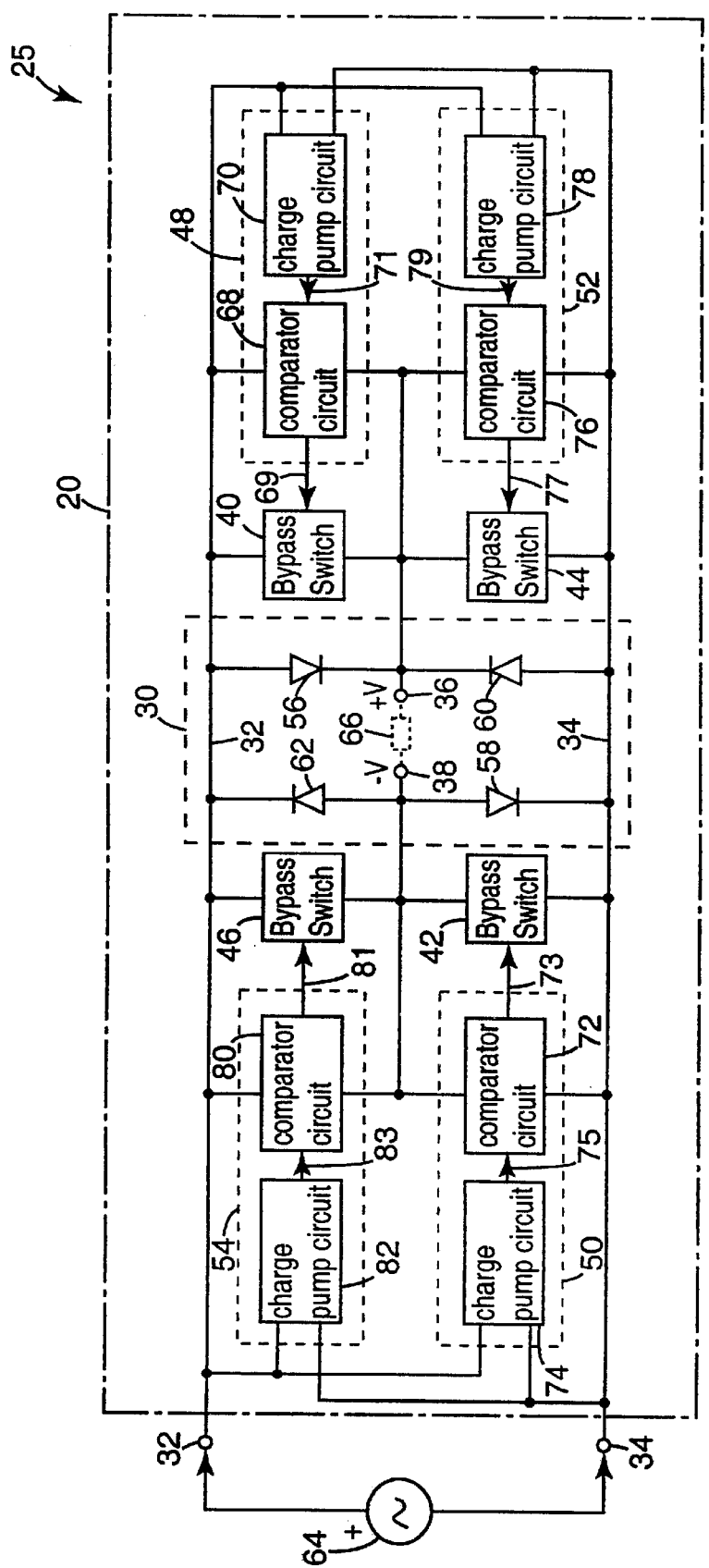
FIG. 1 is a block diagram of one exemplary embodiment of a synchronous bridge rectifier according to the present invention.

A full-wave AC synchronous rectifier according to the present invention is illustrated generally at 20 in FIG. 1. A bridge rectifier according to the present invention replaces a standard four-diode bridge rectifier with a synchronous switch bridge. By controlling the switches at the line frequency of the voltage source and bypassing the bridge diodes, the conduction losses of the bridge diodes are eliminated, leaving only minor conduction losses through the switches. As a result, the efficiency of the AC to DC conversion process is improved.

Synchronous rectifier 20 includes a diode bridge rectifier 30, input terminals 32 and 34, output terminals 36 and 38, bypass switches 40, 42, 44 and 46, bypass switch control circuits 48, 50, 52 and 54, and charge pump circuits 70, 74, 78 and 82. Diode bridge rectifier 30 further includes discrete bridge diodes 56, 58, 60 and 62 connected in a rectifier configuration.

Synchronous rectifier 20 is designed to function as a full-wave rectifier and converts an AC voltage source 64 applied at input terminals 32 and 34 to a DC voltage at output terminals 36 and 38, with terminal 36 being the positive terminal and terminal 38 being the negative terminal. The load 66 can be any load requiring a DC voltage to operate including, but not limited to, a DC converter or electronic equipment. Together, synchronous rectifier 20 and AC voltage source 64 form a power source 25 for providing a DC voltage to load 66.

Synchronous rectifier 20 includes a synchronous switch bridge consisting of bypass switches 40, 42, 44 and 46 and their associated switch control circuits 48, 50, 52 and 54. Synchronous switch bridge in combination with rectifier 30 is described in detail in this application.

Diode bridge 30 is coupled between AC input nodes 32 and 34. Diode bridge 30 comprises a first diode 56 having an anode coupled to AC input terminal 32 and a cathode coupled to positive DC output terminal 36, a second diode 58 having an anode coupled to negative DC output terminal 38 and a cathode coupled to AC input terminal 34, a third diode 60 having an anode coupled to AC input terminal 34 and a cathode coupled to positive DC output terminal 36, and a fourth diode 62 having an anode coupled to negative DC output terminal 38 and a cathode coupled to AC input terminal 32.

Bypass switch 40 and comparator circuit 68 are coupled in parallel with bridge diode 56 between AC input terminal 32 and positive DC output terminal 36. Comparator circuit 68 compares the voltage across bridge diode 56 with a reference voltage to determine when bridge diode 56 is forward biased. When bridge diode 56 is forward biased, comparator circuit 68 provides a first comparator output voltage level to bypass switch 40 via a line 69 to turn on bypass switch 40, causing bridge diode 56 to be bypassed. When bridge diode 56 is reverse biased, comparator circuit 68 provides a second comparator output voltage level to bypass switch 40 via line 69 to turn off bypass switch 40, causing bridge diode 56 to be returned to the circuit. Charge pump circuit 70 is coupled between AC input terminals 32 and 34 and provides a voltage level to comparator circuit 68 via a line 71 to allow comparator circuit 68 to properly bias bypass switch 40.

Bypass switch 42 and comparator circuit 72 are coupled in parallel with bridge diode 58 between AC input terminal 34 and negative DC output terminal 38. Comparator circuit 72 compares the voltage across bridge diode 58 with a reference voltage to determine when bridge diode 58 is forward biased. When bridge diode 58 is forward biased, comparator circuit 72 provides a first comparator output voltage level to bypass switch 42 via a line 73 to turn on bypass switch 42, causing bridge diode 58 to be bypassed. When bridge diode 58 is reverse biased, comparator circuit 72 provides a second comparator output voltage level to bypass switch 42 via line 73 to turn off bypass switch 42, causing bridge diode 58 to be returned to the circuit. Charge pump circuit 74 is coupled between AC input terminals 32 and 34 and provides a voltage level to comparator circuit 72 via a line 75 to allow comparator circuit 72 to properly bias bypass switch 42.

Bypass switch 44 and comparator circuit 76 are coupled in parallel with bridge diode 60 between AC input terminal 34 and positive DC output terminal 36. Comparator circuit 76 compares the voltage across bridge diode 60 with a reference voltage to determine when bridge diode 60 is forward biased. When bridge diode 60 is forward biased, comparator circuit 76 provides a first comparator output voltage level to bypass switch 44 via a line 77 to turn on bypass switch 44, causing bridge diode 60 to be bypassed. When bridge diode 60 is reverse biased, comparator circuit 76 provides a second comparator output voltage level to bypass switch 44 via line 77 to turn off bypass switch 44, causing bridge diode 60 to be returned to the circuit. Charge pump circuit 78 is coupled between AC input terminals 32 and 34 and provides a voltage level to comparator circuit 76 via a line 79 to allow comparator circuit 76 to properly bias bypass switch 44.

Bypass switch 46 and comparator circuit 80 are coupled in parallel with bridge diode 62 between AC input terminal 32 and negative DC output terminal 38. Comparator circuit 80 compares the voltage across bridge diode 62 with a reference voltage to determine when bridge diode 62 is forward biased. When bridge diode 62 is forward biased, comparator circuit 80 provides a first comparator output voltage level to bypass switch 46 via a line 81 to turn on bypass switch 46, causing bridge diode 62 to be bypassed. When bridge diode 62 is reverse biased, comparator circuit 80 provides a second comparator output voltage level to bypass switch 46 via line 81 to turn off bypass switch 46, causing bridge diode 62 to be returned to the circuit. Charge pump circuit 82 is coupled between AC input terminals 32 and 34 and provides a voltage level to comparator circuit 80 via a line 83 to allow comparator circuit 80 to properly bias bypass switch 46.

One embodiment of a full-wave synchronous rectifier according to the present invention utilizes n-channel metal-oxide field-effect transistors (NMOS) as bypass switches. An inherent characteristic of NMOS transistors, due to their construction, is that they exhibit properties of having a diode coupled between the source and drain of the transistor that is "anti-parallel" to the normal direction of current flow through the transistors. In other words, NMOS transistors behave electrically as though there is a discrete diode coupled between the drain and source, wherein the cathode of the diode is coupled to the drain and the anode is coupled to the source. This "diode" is referred to as a parasitic diode. A p-channel metal-oxide field-effect transistor (PMOS) behaves similarly to an NMOS transistor, except that the parasitic diode has its cathode coupled to the source and its anode coupled to the drain.

In one embodiment of the present invention, as illustrated schematically in FIG. 2 and configured as described below, NMOS transistors are utilized as the bypass switches and their associated parasitic diodes are utilized to replace the discrete diodes and form the diode bridge rectifier, 30. Synchronous rectifier 20 includes a first AC input terminal 32, a second AC input terminal 34, a positive DC output terminal 36, a negative DC output terminal 36, and four NMOS transistors 90, 92, 94 and 96.

NMOS transistor 90 has a source coupled to AC input terminal 32, a drain coupled to positive DC output terminal 36, a gate coupled to comparator circuit 48. NMOS transistor 90 further comprises a parasitic diode 91 having an anode coupled to AC input terminal 32 and a cathode coupled to positive DC output terminal 36.

Comparator circuit 48 is coupled in parallel with parasitic diode 91 and includes an operation amplifier 100 having a non-inverting terminal 102, an inverting terminal 104, an output terminal 106, a negative voltage terminal 108, and a positive voltage terminal 110. Negative voltage terminal 108 is coupled to AC input terminal 32 via a line 109, and positive voltage terminal 110 is coupled to a charge pump circuit 300 (see FIG. 3A). A first resistor 112 is coupled between inverting terminal 104 and positive DC output terminal 36. A second resistor 114 is coupled between inverting terminal 104 and AC input terminal 32. A diode 116 has an anode coupled to inverting terminal 104 and a cathode coupled to AC input terminal 32, and limits the voltage at inverting terminal 104. A capacitor 118 has a first terminal coupled to inverting terminal 104 and AC input terminal 32, and functions as a high-frequency filter. A third resistor 120 is coupled between non-inverting terminal 102 and AC input terminal 32. A fourth resistor 122 is coupled between output terminal 106 and the control gate of NMOS transistor 90.

A second NMOS transistor 92 has a source coupled to negative DC output terminal 38, a drain coupled to AC input terminal 34, and a gate coupled to comparator circuit 50. NMOS transistor 92 further comprises a parasitic diode 93 having an anode coupled to negative DC output terminal 38 and a cathode coupled to AC input terminal 34.

Comparator circuit 50 is coupled in parallel with parasitic diode 93 and includes an operation amplifier 130 having a non-inverting terminal 132, an inverting terminal 134, an output terminal 136, a negative voltage terminal 138, and a positive voltage terminal 140. Negative voltage terminal 138 is coupled to negative DC output terminal 38 via a line 139, and positive voltage terminal 140 is coupled to a charge pump circuit 360 (see FIG. 3C). A first resistor 142 is coupled between inverting terminal 134 and negative DC output terminal 38. A second resistor 144 is coupled between inverting terminal 134 and AC input terminal 34. A diode 146 has an anode coupled to inverting terminal 134 and a cathode coupled to negative DC output terminal 38, and limits the voltage at inverting terminal 134. A capacitor 148 has a first terminal coupled to inverting terminal 134 and negative DC output terminal 38, and functions as a high-frequency filter. A third resistor 150 is coupled between non-inverting terminal 132 and negative DC output terminal 38. A fourth resistor 152 is coupled between output terminal 136 and the control gate of NMOS transistor 92.

A third NMOS transistor 94 has a source coupled to AC input terminal 34, a drain coupled to positive DC output terminal 36, and a gate coupled to comparator circuit 52. NMOS transistor 94 further comprises a parasitic diode 95 having an anode coupled to AC input terminal 34 and a cathode coupled to positive DC output terminal 36.

Comparator circuit 52 is coupled in parallel with parasitic diode 95 and includes an operation amplifier 160 having a non-inverting terminal 162, an inverting terminal 164, an output terminal 166, a negative voltage terminal 168, and a positive voltage terminal 170. Negative voltage terminal 168 is coupled to AC input terminal 34 via a line 169, and positive voltage terminal 170 is coupled to a charge pump circuit 330 (see FIG. 3B). A first resistor 172 is coupled between inverting terminal 164 and positive DC output terminal 36. A second resistor 174 is coupled between inverting terminal 164 and AC input terminal 34. A diode 176 has an anode coupled to inverting terminal 164 and a cathode coupled to AC input terminal 34, and limits the voltage at inverting terminal 164. A capacitor 178 has a first terminal coupled to inverting terminal 164 and AC input terminal 34, and functions as a high-frequency filter. A third resistor 180 is coupled between non-inverting terminal 162 and AC input terminal 34. A fourth resistor 182 is coupled between output terminal 166 and the control gate of NMOS transistor 94.

A fourth NMOS transistor 96 has a source coupled to negative DC output terminal 38, a drain coupled to AC input terminal 32, and a gate coupled to comparator circuit 54. NMOS transistor 96 further comprises a parasitic diode 97 having an anode coupled to negative DC output terminal 38 and a cathode coupled to AC input terminal 32.

Comparator circuit 54 is coupled in parallel with parasitic diode 97 and includes an operation amplifier 190 having a non-inverting terminal 192, an inverting terminal 194, an output terminal 196, a negative voltage terminal 198, and a positive voltage terminal 200. Negative voltage terminal 198 is coupled to negative DC output terminal 38 via a line 199, and positive voltage terminal 200 is coupled to a charge pump circuit 360 (see FIG. 3C). A first resistor 202 is coupled between inverting terminal 194 and AC input terminal 32. A second resistor 204 is coupled between inverting terminal 194 and negative DC output terminal 38. A diode 206 has an anode coupled to inverting terminal 194 and a cathode coupled to negative DC output terminal 38, and limits the voltage at inverting terminal 194. A capacitor 208 has a first terminal coupled to inverting terminal 194 and negative DC output terminal 38, and functions as a high-frequency filter. A third resistor 210 is coupled between non-inverting terminal 192 and negative DC output terminal 38. A fourth resistor 212 is coupled between output terminal 196 and the control gate of NMOS transistor 96.

Figure 3B:
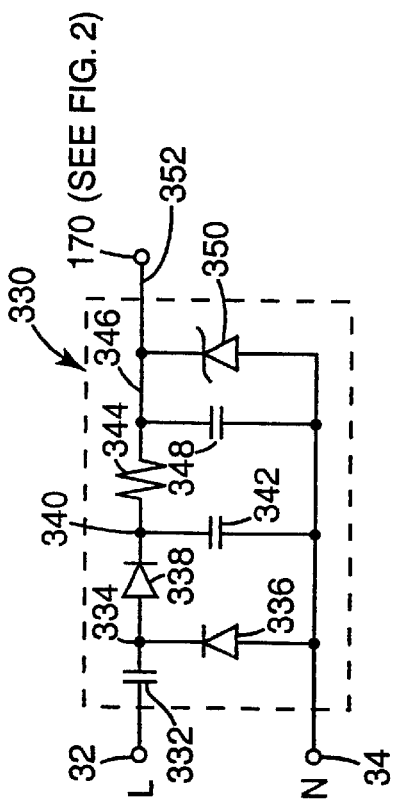
FIG. 3B is a schematic diagram of one exemplary embodiment of a second charge pump circuit for the synchronous bridge rectifier of FIG. 2.
Figure 3A:
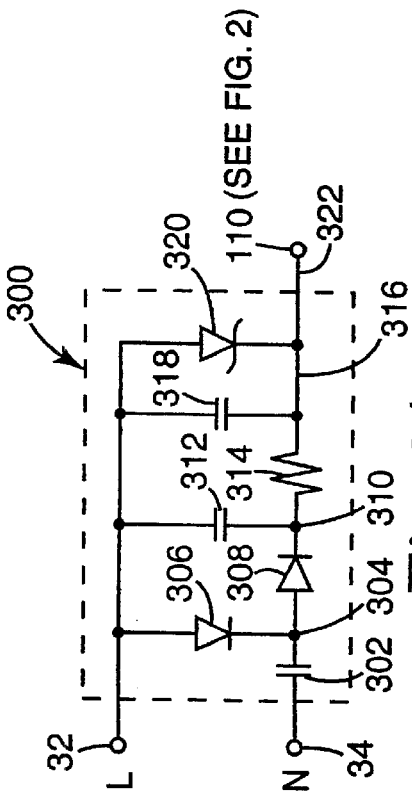
FIG. 3A is a schematic diagram of one exemplary embodiment of a first charge pump circuit for the synchronous bridge rectifier of FIG. 2.
Figure 3C:
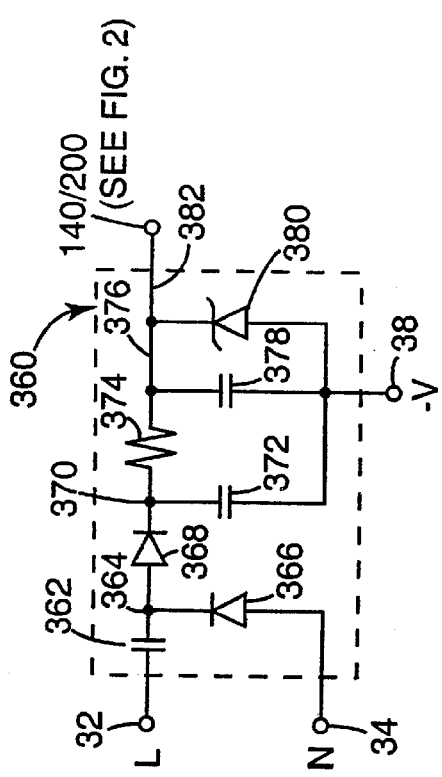
FIG. 3C is a schematic diagram of one exemplary embodiment of a third charge pump circuit for the synchronous bridge rectifier of FIG. 2.

FIGS. 3A, 3B and 3C illustrate exemplary embodiments of charge pump circuits used with the synchronous bridge rectifier according to the present invention. See also U.S. patent application Ser. No. 09/990,145, entitled "Charge-Pumped DC Bias Supply," which is incorporated herein by reference. Other suitable charge pump circuits for use with present invention will become apparent to those skilled in the art after reading this application.

FIG. 3A illustrates one exemplary embodiment of charge pump circuit 300. Charge pump 300 comprises a first capacitor 302 with a first terminal coupled to AC input terminal 34 and a second terminal coupled to a first node 304. A first diode 306 has an anode coupled to AC input terminal 32 and a cathode coupled to node 304. A second diode 308 has an anode coupled to node 304 and a cathode coupled to a second node 310. A second capacitor 312 has a first terminal coupled to AC input terminal 32 and a second terminal coupled to the second node 310. A resistor 314 has a first terminal coupled to node 310 and a second terminal coupled to an output node 316. A third capacitor 318 has a first terminal coupled to AC input terminal 32 and a second terminal coupled to output node 316. A zener diode 320 has an anode coupled to AC input terminal 32 and a cathode coupled to output node 316. Output node 316 is coupled via a line 322 to the positive voltage terminal 110 of operational amplifier 100.

FIG. 3B illustrates one exemplary embodiment of charge pump circuit 330. Charge pump 330 comprises a first capacitor 332 with a first terminal coupled to AC input terminal 32 and a second terminal coupled to a first node 334. A first diode 336 has an anode coupled to AC input terminal 34 and a cathode coupled to node 334. A second diode 338 has an anode coupled to node 334 and a cathode coupled to a second node 340. A second capacitor 342 has a first terminal coupled to AC input terminal 34 and a second terminal coupled to the second node 340. A resistor 344 has a first terminal coupled to node 340 and a second terminal coupled to an output node 346. A third capacitor 348 has a first terminal coupled to AC input terminal 34 and a second terminal coupled to output node 346. A zener diode has an anode coupled to AC input terminal 34 and a cathode coupled to output node 346. Output node 346 is coupled via a line 352 to the positive voltage terminal 170 of operational amplifier 160.

FIG. 3C illustrates one exemplary embodiment of charge pump circuit 360. Charge pump 360 comprises a first capacitor 362 with a first terminal coupled to AC input terminal 32 and a second terminal coupled to a first node 364. A first diode 366 has an anode coupled to AC input terminal 34 and a cathode coupled to node 364. A second diode 368 has an anode coupled to node 334 and a cathode coupled to a second node 370. A second capacitor 372 has a first terminal coupled to negative DC output terminal 38 and a second terminal coupled to node 370. A resistor 374 has a first terminal coupled to node 370 and a second terminal coupled to an output node 376. A third capacitor 378 has a first terminal coupled to negative DC output terminal 38 and a second terminal coupled to output node 376. A zener diode has an anode coupled to negative DC output terminal 38 and a cathode coupled to output node 376. Output node 376 is coupled via a line 382 to positive voltage terminal 140 of operational amplifier 130 and to positive voltage terminal 200 of operational amplifier 190.

Figure 2:
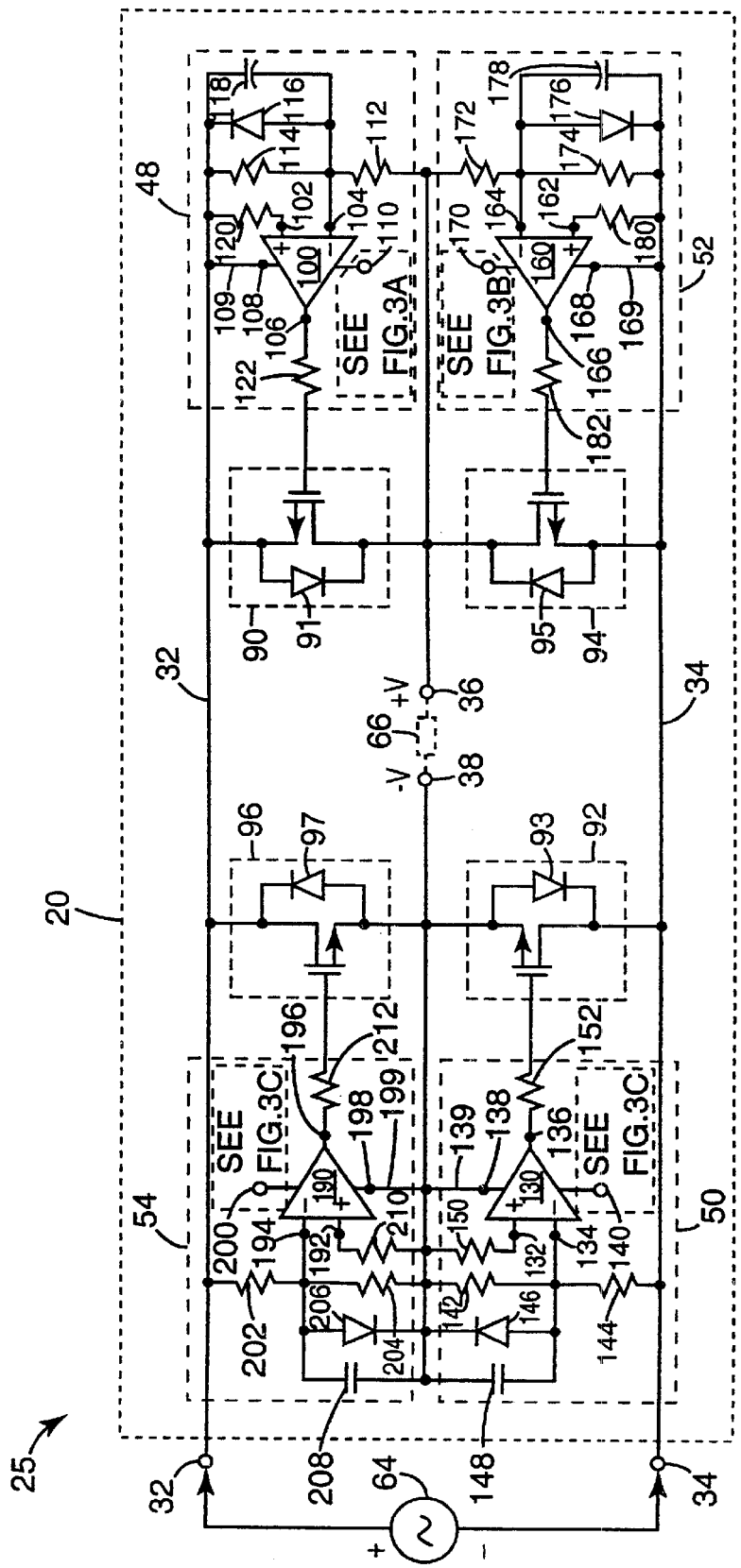
FIG. 2 is a schematic diagram of one embodiment of the synchronous bridge rectifier of FIG. 1.

Synchronous bridge rectifier 20, as illustrated in FIG. 2, operates as follows to provide a DC voltage between positive DC output node 36 and negative DC output node 38. With no voltage source present at AC input terminals 32 and 34, all devices are off. When an AC voltage source 64 is first applied between AC input terminals 32 and 34, rectification is initially performed by the four parasitic diodes 91, 93, 95 and 97, that are coupled in the classic diode bridge configuration. This initial rectification typically occurs during the first one-to-three AC cycles while charge pump circuits 300, 330 and 360 are charging. Once the charge pump circuits have become charged and are providing the required voltage levels to the positive voltage terminals 110, 140, 170 and 200 of operational amplifiers 100, 130, 160 and 190, respectively, comparator circuits 48, 50, 52 and 54 compare a voltage level across their associated parasitic diode to a reference voltage level. The comparator circuits turn on their associated NMOS transistor when the voltage level across the parasitic diode exceeds the reference voltage level, and turn off their associated NMOS transistor when the voltage level across the parasitic diode is less than the reference voltage level, thereby performing rectification through synchronous switching of the bypass switches.

Each comparator circuit utilizes a near-zero voltage level as its reference voltage level. The reference voltage level for comparator circuit 48 is the level at non-inverting terminal 102 with respect to AC input terminal 32. The reference voltage for comparator circuit 50 is the level at non-inverting terminal 132 with respect to negative DC output terminal 38. The reference voltage for comparator circuit 52 is the level at non-inverting terminal 162 with respect to AC input terminal 34. The reference voltage for comparator circuit 54 is the level at non-inverting terminal 192 with respect to negative DC output terminal 38. Resistors 120, 150, 180 and 210 represent impedances necessary to maintain current flow into their associated non-inverting terminals at near-zero levels.

During a positive half-cycle of AC voltage source 64, when AC input terminal 32 is positive, rectification is performed by turning on NMOS transistors 90 and 92 and by turning off NMOS transistors 94 and 96. As AC voltage source 64 begins a positive half-cycle, parasitic diodes 91 and 93 begin to conduct current and become forward biased. The voltage drop across parasitic diode 91, from its anode at input 32 to its cathode at positive DC output terminal 36, is positive with respect to the near-zero reference voltage at non-inverting terminal 102 of operational amplifier 100. Comparator circuit 48 senses that the voltage drop across parasitic diode 91 exceeds the reference voltage and provides a control voltage level, via output terminal 106 and resistor 122, to the gate of NMOS transistor 90 to thereby forward bias the gate with respect to input terminal 32 and turn on NMOS transistor 90. Likewise, the voltage drop across parasitic diode 93, from its anode at negative DC output terminal 38 to its cathode at AC input terminal 34, is positive with respect to the near-zero reference voltage at non-inverting terminal 132 of operational amplifier 130. Comparator circuit 50 senses that the voltage drop across parasitic diode 93 exceeds the reference voltage and provides a control voltage level, via output terminal 136 and resistor 152, to the gate of NMOS transistor 92 to thereby forward bias the gate with respect to negative DC output terminal 38 and turn on NMOS transistor 92.

During the same positive half-cycle, parasitic diodes 95 and 97 are reverse-biased and are not conducting current. The voltage drop across parasitic diode 95, from its anode at AC input terminal 34 to its cathode at negative DC output terminal 36, is negative with respect to the near-zero reference voltage at non-inverting terminal 132 of operational amplifier 130. Comparator circuit 52 senses that the voltage drop across parasitic diode 95 is less than the reference voltage and maintains NMOS transistor 94 in the off position. Likewise, the voltage drop across parasitic diode 97, from its anode at negative DC output terminal 38 to its cathode at AC input terminal 32, is negative with respect to the near-zero reference voltage at non-inverting terminal 192 of operational amplifier 190. Comparator circuit 54 senses that the voltage drop across parasitic diode 97 is less than the reference voltage and maintains NMOS transistor 96 in the off position.

Thus, during a positive half-cycle of AC voltage source 64, parasitic diodes 91 and 93 are bypassed by NMOS transistors 90 and 92, respectively. During the positive half-cycle, current flows in the path from AC voltage source 64 into AC input terminal 32, through NMOS transistor 90, external load 66, NMOS transistor 92, and back to voltage source 64 via AC input terminal 34.

Conversely, during a negative half-cycle of AC voltage source 64, when AC input terminal 34 is positive, rectification is performed by turning off bypass switches 90 and 92 and by turning on bypass switches 94 and 96. As AC voltage source 64 begins a negative half-cycle, parasitic diodes 95 and 97 begin to conduct current and become forward biased. The voltage drop across parasitic diode 95, from its anode at AC input terminal 34 to its cathode at positive DC output terminal 36, is positive with respect to the near-zero reference voltage at non-inverting terminal 162 of operational amplifier 160. Comparator circuit 52 senses that the voltage drop across parasitic diode 95 exceeds the reference voltage and provides a control voltage level, via output terminal 166 and resistor 182, to the gate of NMOS transistor 94 to thereby forward bias the gate with respect to input terminal 34 and turn on NMOS transistor 94. Likewise, the voltage drop across parasitic diode 97, from its anode at negative DC output terminal 38 to its cathode at AC input terminal 32, is positive with respect to the near-zero reference voltage at non-inverting terminal 192 of operational amplifier 190. Comparator circuit 54 senses that the voltage drop across parasitic diode 97 exceeds the reference voltage and provides a control voltage level, via output terminal 196 and resistor 212, to the gate of NMOS transistor 96 to thereby forward bias the gate with respect to negative DC output terminal 38 and turn on NMOS transistor 96.

During the same negative half-cycle, parasitic diodes 91 and 93 are reverse-biased and are not conducting current. The voltage drop across parasitic diode 91, from its anode at AC input terminal 32 to its cathode at positive DC output terminal 36, is negative with respect to the near-zero reference voltage at non-inverting terminal 102 of operational amplifier 100. Comparator circuit 48 senses that the voltage drop across parasitic diode 91 is less than the reference voltage and maintains NMOS transistor 90 in the off position. Likewise, the voltage drop across parasitic diode 93, from its anode at negative DC output terminal 38 to its cathode at AC input terminal 34, is negative with respect to the near-zero reference voltage at non-inverting terminal 132 of operational amplifier 130. Comparator circuit 50 senses that the voltage drop across parasitic diode 93 is less than the reference voltage and maintains NMOS transistor 92 in the off position.

To summarize, during the positive half-cycle of AC voltage source 64, NMOS transistors 90 and 92 are turned on to bypass parasitic diodes 91 and 93, while NMOS transistors 94 and 96 are turned off. Conversely, during the negative half-cycle of AC voltage source 64, NMOS transistors 94 and 96 are turned on to bypass parasitic diodes 95 and 97, while NMOS transistors 90 and 92 are turned off. Thus, during the positive half-cycle, current flows in the path from AC voltage source 64 into AC input terminal 34, through NMOS transistor 90, external load 66, NMOS transistor 92, and back to voltage source 64 via AC input terminal 34. Similarly, during the negative half-cycle, current flows in the path from AC voltage source 64 into AC input terminal 34, through NMOS transistor 94, external load 66, NMOS transistor 96, and back to AC voltage source 64 via AC input terminal 32. Thus, rectification is achieved by continuously switching NMOS transistors 90, 92, 94 and 96 synchronously with AC voltage source 64.

During the rectification process, the charge pumps provide a voltage level to the comparator circuits to power the operational amplifiers and to allow the operational amplifiers to properly bias the control gates of the associated power switches. Charge pump 300, as illustrated by FIG. 3A, provides a voltage level to positive voltage terminal 110 of operational amplifier 100. The source gate of NMOS transistor 90 is coupled to AC input terminal 32. Therefore, charge pump 300 is designed to provide a voltage level to operational amplifier 100 that is sufficiently higher than the voltage level at AC input terminal 32 (approximately 15 volts higher) so that the output of operational amplifier 100 at output terminal 106 can properly bias the control gate of NMOS transistor 90 to turn it on when parasitic diode 91 is forward biased. During a first half-cycle of AC voltage source 64, AC input terminal 32 is positive and diode 306 becomes forward biased. Current then flows from AC input terminal 32, through diode 306 and back to AC voltage source 64 via capacitor 306. Capacitor 306, referred to as the "pump" capacitor, is consequently charged with the positive pole being node 304. As AC voltage source 64 passes its positive peak, diode 306 becomes reverse biased while diode 308 become forward biased, and the charge on pump capacitor 302 is "pumped" into "storage" capacitor 312. During the second half-cycle of AC voltage source 64, AC input terminal 32 is negative and diodes 306 and 308 are forward-biased, resulting in no current flow into input terminal 32 from voltage source 64. Consequently, a half-wave rectified current signal is supplied to storage capacitor 312 resulting in a DC voltage level being provided at output terminal 322. Resistor 314, capacitor 318 and zener diode 320 serve to filter and stabilize the output voltage level at output node 332, which is referenced to AC input terminal 32.

Charge pump 330, as illustrated by FIG. 3B, provides a voltage level to positive voltage terminal 170 of operational amplifier 160. The gate of NMOS transistor 94 is coupled to AC input terminal 34. Therefore, charge pump 330 is designed to provide a voltage level to operational amplifier 160 that is sufficiently higher than the voltage level at AC input terminal 34 (approximately 15 volts higher) so that the output of operational amplifier 160 at output terminal 166 can properly bias the control gate of NMOS transistor 94 to turn it on when parasitic diode 95 is forward biased. During a first half-cycle of AC voltage source 64, AC input terminal 34 is positive and diode 336 becomes forward biased. Current then flows from AC input terminal 34, through diode 336 and back to AC voltage source 64 via capacitor 332. Capacitor 332, referred to as the "pump" capacitor, is consequently charged with the positive pole being node 334. As AC voltage source 78 passes its negative peak, diode 336 becomes reverse-biased while diode 338 become forward biased, and the charge stored by pump capacitor 332 is "pumped" into "storage" capacitor 342. During the second half-cycle of AC voltage source 64, AC input terminal 34 is negative and diodes 336 and 338 are reverse-biased, resulting in no current flow into input terminal 34 from voltage source 64. Consequently, a half-wave rectified current signal is supplied to "storage" capacitor 342 resulting in a DC voltage level being provided at positive voltage terminal 352. Resistor 344, capacitor 348 and zener diode 350 serve to filter and stabilize the output voltage level at output node 352, which is referenced to AC input terminal 34.

Charge pump 360, as illustrated by FIG. 3C, provides a voltage level to positive voltage terminals 140 and 200 of operational amplifiers 130 and 190, respectively. Because the source gates of NMOS transistors 92 and 96 are both coupled to negative DC output terminal 38, operational amplifiers 140 and 200 can share a single charge pump circuit rather than each requiring its own charge pump circuit. Therefore, charge pump circuit 360 is designed to provide a voltage level to operational amplifiers 130 and 190 that is sufficiently higher than the voltage level at DC output terminal 38 (approximately 15 volts higher) so that the output of operational amplifiers 130 and 190 at output terminals 136 and 196 can properly bias the control gates of NMOS transistors 92 and 96 to turn them on when their associated parasitic diodes 93 and 97 are forward biased. Charge pump 360 operates similarly to charge pump 330, as described by FIG. 3B above, except that the voltage at output node 376 is referenced to negative DC output terminal 38. When AC input terminal 34 is positive, "pump" capacitor 362 is charged. When AC input terminal 34 is negative, the stored charge in capacitor 362 is "pumped" to storage capacitor 372. Resistor 374, capacitor 378 and zener diode 380 serve to filter and stabilize the output voltage level at output node 382, which is referenced to negative DC output terminal 38.

A synchronous bridge rectifier according to the present invention replaces a standard four-diode bridge rectifier with a synchronous switch bridge. By controlling the switches at the line frequency of the voltage source and bypassing the bridge diodes, the conduction losses of the bridge diodes are eliminated, leaving only minor conduction losses through the switches. As a result, the efficiency of the AC to DC conversion process is improved. As an example, consider a 120Vac source supplying 8A rms, which yields a power consumed of 960 Watts. A standard four diode bridge rectifier will dissipate approximately 12.8 Watts of energy (8A times two diode voltage drops of 0.8V) which yields an AC-to-DC conversion efficiency of 98.666%. A synchronous rectifier according to the present invention will dissipate approximately 5.5 Watts (8A times 8A times 0.043 Ohms times two switches-resistance being that of an IRFPS6ON50C transistor) which yields and AC-to-DC conversion efficiency of 99.427%. Thus, the present invention reduces losses by approximately 7.3 Watts, which may eliminate the need for heat sinking and forced air convection cooling of the power converter. As the "on" impedance of the power switches continues to improve, so will the operating efficiency of the present invention.

The present invention also allows power converters to operate more efficiently at very low power levels. As an example, consider a 120Vac source supplying 0.5 A rms for a total power consumption of 60 Watts. A standard four diode bridge rectifier will dissipate approximately 0.8 Watts which yields an AC-to-DC conversion efficiency of 98.666%. A synchronous rectifier according to the present invention will dissipate approximately 0.0215 Watts which yields an AC-to-DC conversion efficiency of 99.964%. Thus, the present invention reduces losses by approximately 0.7785 Watts, which may allow a product that is on the verge of failing EPA low power limits to pass with margin.

In conclusion, a power converter utilizing the present invention improves the efficiency of the AC-to-DC conversion process and reduces the generation of waste heat by bypassing the standard bridge diodes and performing rectification through synchronous control of bypass switches. The reduction in waste heat may allow heat sinks to be removed from the power converter, thus saving space, and in-turn may eliminate the need and cost of forced convective cooling. Elimination of cooling fans further reduces energy consumed by the converter. UL and CSA standards presently limit power use on a standard 120Vac, 15A receptacle to 1500W. The improvement in efficiency may allow products presently exceeding this design limit to utilize a single power cord rather than two power cords. The improvement in efficiency also yields additional energy that is available for other system uses within the product and improves the ability of products to meet EPA low power limits. Furthermore, the components of the present invention can be selected to optimize performance for a given product, and as the "on" resistance of the power switches continues to improve, so too will the potential operating efficiency of the present invention. Electronic devices, including laser printers and copiers, would especially benefit from the power and space saving characteristics of the present invention.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A full-wave AC synchronous bridge rectifier connectable to an AC voltage source, the system comprising:
   a full-wave diode bridge rectifier having four bridge diodes;
   a power switch connected in parallel with each bridge diode, each power switch having a control gate; and
   a power switch control circuit in parallel with each bridge diode and electrically coupled to the control gate of the associated power switch, wherein each power switch control circuit provides a first control voltage to its associated power switch control gate when the parallel-connected bridge diode is forward-biased to turn on the power switch, and provides a second control voltage to its associated power switch control gate when the diode is reverse-biased to turn off the power switch to provide rectification through synchronous control of the power switches.

2. The bridge rectifier of claim 1, wherein the bridge diodes comprise four discrete diodes coupled to form the full-wave diode bridge rectifier.

3. The bridge rectifier of claim 1, wherein each power switch is an n-channel transistor having a source coupled to the anode and a drain coupled to the cathode of its parallel-connected bridge diode, and having a control gate coupled to its associated switch control circuit.

4. The bridge rectifier of claim 3, wherein the bridge diodes comprise four parasitic diodes, one parasitic diode associated with each n-channel transistor, coupled to form the full-wave diode bridge rectifier.

5. The bridge rectifier of claim 1, wherein each power switch is a p-channel transistor.

6. The bridge rectifier of claim 1, wherein each power switch control circuit further comprises a comparator circuit to compare a voltage across its associated bridge diode to a reference voltage.

7. The bridge rectifier of claim 1, wherein each power switch control circuit further comprises a charge pump circuit to provide a voltage level to the comparator circuit to enable the comparator circuit to properly bias the power switch control gate.

8. The bridge rectifier of claim 7, wherein each comparator circuit comprises:
   an operational amplifier having an inverting terminal, a noninverting terminal, an output terminal, a positive voltage terminal coupled to the charge pump circuit and a negative voltage terminal coupled to the anode of the bridge diode; and
   a first resistor coupled between the inverting terminal and the anode of the bridge diode; and
   a second resistor coupled between the inverting terminal and the cathode of the bridge diode; and
   a third resistor coupled between the noninverting terminal and the anode of the bridge diode.

9. The bridge rectifier of claim 8, wherein the comparator circuit further comprises hysteresis and comparator limits to prevent inadvertent switching of the associated power switch.

10. The bridge rectifier of claim 8, wherein the comparator circuit includes a filter on the operational amplifier inverting terminal for high frequency rejection.

11. The bridge rectifier of claim 10, wherein the filter comprises a capacitor coupled between inverting terminal and the negative voltage terminal of the operation amplifier.

12. The bridge rectifier of claim 8, wherein the comparator circuit further comprises a voltage limiting device to limit the voltage level at the operation amplifier inverting terminal when the associated power switch is off.

13. The bridge rectifier of claim 12, wherein the voltage limiting device comprises a diode coupled between the inverting and negative voltage terminals of the operational amplifier.

14. The bridge rectifier of claim 12, wherein the voltage limiting device comprises a diac coupled between the inverting terminal and the negative voltage terminal of the operational amplifier.

15. A full-wave AC synchronous rectifier connectable to an AC voltage source across a first input node and a second input node, the rectifier comprising:
   a diod-bridge rectifier comprising four bridge diodes;
   a switch coupled in parallel with each bridge diode, each switch having a control gate;
   first, second and third charge pump circuits, each providing a biasing voltage; and
   four comparator circuits, one coupled in parallel with each bridge diode and to the associated switch control gate, the first receiving a biasing voltage from the fiat charge pump circuit, the second receiving a biasing voltage from the second charge pump circuit, and the third and fourth receiving a biasing voltage from the third charge pump circuit, wherein each comparator circuit compares a voltage level across the associated bridge diode to a reference voltage, turns on the associated switch when the reference voltage exceeds the voltage level across the bridge diode, and turns off the switch when the voltage level across the bridge diode exceeds the reference voltage to provide synchronous rectification through control of the switches.

16. The bridge rectifier of claim 15, wherein the bridge diodes comprise four discrete diodes coupled to from the diode-bridge rectifier.

17. The bridge rectifier of claim 15, wherein each switch is an n-channel transistor having a source coupled to the anode and a drain coupled to the cathode of its parallel-connected bridge diode, and having a control gate coupled to its associated switch control circuit.

18. The bridge rectifier of claim 17, wherein the bridge diodes comprise four parasitic diodes, one parasitic diode associated with each n-channel transistor, coupled to form the diode-bridge rectifier.

19. The bridge rectifier of claim 15, wherein each switch is a p-channel transistor.

20. The bridge rectifier of claim 15, wherein each comparator circuit comprises:
   an operational amplifier having inverting terminal, a noninverting terminal, an output terminal, a positive voltage terminal coupled to the charge pump circuit, and a negative, voltage terminal coupled to the anode of the bridge diode; and
   a first resistor coupled between the inverting terminal and the anode of the bridge diode; and
   a second resistor coupled between the inverting terminal and the cathode of the bridge diode; and
   a third resistor coupled between the noninverting terminal and the anode of the bridge diode.

21. The bridge rectifier of claim 20, wherein the comparator circuit further comprises a voltage limiting device to limit the voltage level at the operational amplifier inverting terminal when the associated switch is off.

22. The bridge rectifier of claim 21, wherein the voltage limiting device comprises a diode having an anode coupled to the operational amplifier inverting terminal and a cathode coupled to the operational amplifier negative voltage terminal.

23. The bridge rectifier of claim 20, wherein the anode of the bridge diode associated with the first comparator circuit is coupled to a first AC input terminal.

24. The bridge rectifier of claim 23, wherein the first charge pump circuit comprises:
   a first capacitor coupled between the second AC input terminal and a first node;
   a first diode having an anode coupled to the first AC input terminal and a cathode coupled to the first node;
   a second diode having an anode coupled to the first node and a cathode coupled to a second node;
   a second capacitor coupled between the first AC input terminal and the second node;
   a resistor coupled between the second node and an output node;
   a third capacitor coupled between the first AC input terminal and the output node;
   a zener diode having an anode coupled to the first AC input terminal and a cathode coupled to the output node; and
   a line connecting the output node to the positive voltage terminal of the first comparator circuit operational amplifier.

25. The bridge rectifier of claim 23, wherein the second charge pump circuit comprises:
   a first capacitor coupled between the first AC input terminal and a first node;
   a first diode having an anode coupled to the second AC input terminal and a cathode coupled to the first node;
   a second diode having an anode coupled to the first node and a cathode coupled to a second node;
   a second capacitor coupled between the second AC input terminal and the second node;
   a resistor coupled between the second node and an output node;
   a third capacitor coupled between the second AC input terminal and the output node;
   a zener diode having an anode coupled to the second AC input terminal and a cathode coupled to the output node; and
   a line connecting the output node to the positive voltage terminal of the second comparator circuit operational amplifier.

26. The bridge rectifier of claim 23, wherein the third charge pump circuit comprises:
   a first capacitor coupled between the first AC input terminal and a first node.
   a first diode having an anode coupled to the second AC input terminal and a cathode coupled to the first node;
   a second diode having an anode coupled to the first node a d a cathode coupled to a second node;
   a second capacitor coupled between the second node and the negative DC output terminal;
   a resistor coupled between the second node and an output hock;

a third capacitor coupled between the second node and the output node;

a zener diode having an anode coupled to the negative DC output terminal and a cathode coupled to the output node; and a line connecting the output node to the positive voltage terminal of both the third comparator circuit operational amplifier and the fourth circuit operational amplifier.

27. A method of providing a full-wave rectified AC output from an AC voltage source having an AC voltage level, the method comprising:

receiving the AC voltage level from the AC voltage source;

applying the AC voltage level to a full-wave diode bridge rectifier having four bridge diodes;

providing from a power switch control circuit in coupled in parallel with each bridge diode a first control voltage to a power switch control gate of an associated power switch coupled in parallel with each bridge diode to cause the power switch to turn on when the parallel connected bridge diode is forward biased, and providing a second control voltage to the power switch control gate of the associated power switch coupled in parallel with each bridge diode to cause the power switch to turn on when the parallel connected bridge diode is reverse biased, thereby turning the power switches on and off synchronously with the AC voltage level to provide the full-wave rectified AC output.

* * * * *

UNITED STATES PATENT AND TRADEMARK OFFICE
CERTIFICATE OF CORRECTION

PATENT NO. : 6,563,726 B1
DATED : May 13, 2004
INVENTOR(S) : Hirst

It is certified that error appears in the above-identified patent and that said Letters Patent is hereby corrected as shown below:

Column 13,
Line 9, delete "operation" and insert therefor -- operational --.
Line 29, delete "fiat" and insert therefor -- first --.
Line 60, delete "negative," and insert therefor -- negative --.

Column 14,
Line 59, delete "node." and insert therefore -- node; --
Line 63, delete "a d" and insert therefor -- and --.
Line 67, delete "hock;" and insert therefor -- node; --.

Column 15,
Line 8, after "fourth" insert -- comparator --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,563,726 B1
DATED : May 13, 2004
INVENTOR(S) : Hirst

It is certified that error appears in the above-identified patent and that said Letters Patent is hereby corrected as shown below:

Column 13,
Line 9, delete "operation" and insert therefor -- operational --
Line 29, delete "fiat" and insert therefor -- first --.
Line 60, delete "negative," and insert therefor -- negative --

Column 14,
Line 59, delete "node." and insert therefore -- node; --
Line 63, delete "a d" and insert therefor -- and --.
Line 67, delete "hock;" and insert therefore -- node; --.

Column 15,
Line 8, after "fourth" insert -- comparator --.

Signed and Sealed this

Seventeenth Day of August, 2004

JON W. DUDAS
*Acting Director of the United States Patent and Trademark Office*